US010950036B2

(12) United States Patent
Ha et al.

(10) Patent No.: US 10,950,036 B2
(45) Date of Patent: Mar. 16, 2021

(54) METHOD AND APPARATUS FOR THREE-DIMENSIONAL (3D) RENDERING

(71) Applicant: Samsung Electronics Co., Ltd., Suwon-si (KR)

(72) Inventors: In Woo Ha, Seongnam-si (KR); Na Hyup Kang, Seoul (KR); Sung Hoon Hong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/161,188

(22) Filed: Oct. 16, 2018

(65) Prior Publication Data

US 2019/0304172 A1 Oct. 3, 2019

(30) Foreign Application Priority Data

Mar. 27, 2018 (KR) .......................... 10-2018-0034817

(51) Int. Cl.
| | |
|---|---|
| *G06T 15/50* | (2011.01) |
| *G06T 7/73* | (2017.01) |
| *G06T 7/50* | (2017.01) |
| *G06T 15/40* | (2011.01) |

(52) U.S. Cl.
CPC .............. *G06T 15/506* (2013.01); *G06T 7/50* (2017.01); *G06T 7/74* (2017.01); *G06T 15/40* (2013.01); *G06T 2207/10024* (2013.01); *G06T 2207/10028* (2013.01); *G06T 2207/20084* (2013.01); *G06T 2210/12* (2013.01)

(58) Field of Classification Search
CPC combination set(s) only.
See application file for complete search history.

(56) References Cited

U.S. PATENT DOCUMENTS

| | | | |
|---|---|---|---|
| 9,449,427 B1 * | 9/2016 | Baldwin ................. | G06T 15/50 |
| 2007/0098290 A1 * | 5/2007 | Wells ...................... | G06T 15/60 |
| | | | 382/254 |
| 2013/0121567 A1 * | 5/2013 | Hadap ..................... | G06T 15/50 |
| | | | 382/162 |
| 2013/0251243 A1 * | 9/2013 | Shim ....................... | G06T 5/007 |
| | | | 382/154 |

(Continued)

FOREIGN PATENT DOCUMENTS

| | | |
|---|---|---|
| CN | 103413285 A | 11/2013 |
| CN | 103942792 A | 7/2014 |

(Continued)

OTHER PUBLICATIONS

Hong, Eunbin, et al., "Deep Learning based Photo Horizon Correction", *Korea Computer Graphics Society*, vol. 23, No. 3, Jul. 6, 2017 (pp. 95-103).

*Primary Examiner* — Andrew G Yang
(74) *Attorney, Agent, or Firm* — NSIP Law (57) ABSTRACT

Disclosed is a method and apparatus for three-dimensional (3D) rendering, the apparatus including a processor configured to extract shading information, visibility information and shape information from a region of an input image, determine a light source based on the shading information, the visibility information, and the shape information of the region, and generate a 3D rendering image by rendering the input image based on the determined light source.

32 Claims, 7 Drawing Sheets

(56) References Cited

U.S. PATENT DOCUMENTS

| | | | |
|---|---|---|---|
| 2015/0243084 A1* | 8/2015 | Kanemaru | G06K 9/00691 |
| | | | 345/426 |
| 2016/0048988 A1* | 2/2016 | Lee | G06T 11/60 |
| | | | 345/629 |
| 2017/0148204 A1 | 5/2017 | Hakura et al. | |
| 2017/0165569 A1 | 6/2017 | Van Welzen et al. | |
| 2017/0169620 A1 | 6/2017 | Bleiweiss et al. | |
| 2018/0075602 A1* | 3/2018 | Shen | G06T 7/62 |

FOREIGN PATENT DOCUMENTS

| | | |
|---|---|---|
| KR | 10-2012-0040407 A | 4/2012 |
| KR | 10-2017-0074413 A | 6/2017 |

\* cited by examiner

METHOD AND APPARATUS FOR THREE-DIMENSIONAL (3D) RENDERING

CROSS-REFERENCE TO RELATED APPLICATIONS

This application claims the benefit under 35 USC § 119(a) of Korean Patent Application No. 10-2018-0034817 filed on Mar. 27, 2018 in the Korean Intellectual Property Office, the entire disclosure of which is incorporated herein by reference for all purposes.

BACKGROUND

1. Field

The following description relates to three-dimensional (3D) rendering.

2. Description of Related Art

Recently, demand for and application of synthesizing a virtual object with a 3D image and utilizing a synthesized image for fields such as, gaming, education, and medical diagnosis and treatment are increasing. When synthesizing a virtual object with a 3D image, an effect of a light source should be considered. For a natural 3D image synthesis, 3D rendering is to be performed by estimating an actual light source and applying the estimated actual light source to the virtual object.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method for three-dimensional (3D) rendering, the method comprising extracting shading information, visibility information, and shape information from a region of an input image, determining a light source based on the shading information, the visibility information, and the shape information of the region, and generating a 3D rendering image by rendering the input image based on the determined light source.

The determining of the light source may include estimating a position of the light source based on the shading information and the visibility information.

The estimating of the light source may include estimating the position of the light source based on visibility information of a pixel selected based on the shading information.

The estimating of the light source may include estimating that the light source is present in a direction corresponding to a difference of visibility information of pixels in a portion of the input image where a shadow value of adjacent pixels varies.

The estimating of the light source may include extracting a shadow boundary region from the shading information, and estimating the position of the light source based on visibility information of a pixel in the shadow boundary region.

The estimating of the light source may include estimating the position of the light source based on a difference between visibility information of adjacent pixels in the shadow boundary region.

The extracting of the shadow boundary region may include determining whether a pixel of the input image corresponds to the shadow boundary region based on a comparison of a variation of a shadow value of the pixel and a threshold value.

The determining of the light source may include extracting a shadow boundary region from the shading information, and estimating a brightness of the light source based on shading information of a pixel in the shadow boundary region.

The estimating of the brightness of the light source may include estimating the brightness of the light source based on a difference between shadow values of adjacent pixels in the shadow boundary region.

The determining of the light source may include estimating a position of the light source based on a maximum shading value in the shading information.

The estimating of the light source may include estimating the position of the light source based on surface normal information of a pixel having the maximum shading value.

The determining of the light source may include estimating a position of the light source based on context information of the input image.

The input image may include a color image, wherein the extracting may include extracting the shape information of the region from the color image, extracting the shading information and albedo information from the color image, and extracting the visibility information from the color image.

The input image further may include a depth image, wherein the extracting may include extracting the shape information of the background region from the depth image and the color image, and extracting the visibility information from the depth image and the color image.

The shape information of the region may include surface normal information, wherein the extracting of the visibility information may include extracting the visibility information based on depth information of the depth image, 3D bounding box information of the input image, the surface normal information, or the color image.

The visibility information may indicate whether a position of a pixel in the input image is occluded with respect to a plurality of directions.

The generating may include generating the 3D rendering image by combining shape information of an object, the shape information of the background region, and the input image based on the determined light source.

The generating may include comparing albedo information extracted from the input image and surface normal information of the region with albedo information, depth information, type or surface normal information of the object, and determining a pixel value of the 3D rendering image from a pixel value of the input image based on a result of the comparing.

The determining may include determining the pixel value of the 3D rendering image by interpolating pixel values of a first pixel and a second pixel of the input image, in response to the result of the comparing satisfying a threshold.

The region may be a background region of the input image.

In another general aspect, there is provided an apparatus for three-dimensional (3D) rendering, the apparatus including a processor configured to extract shading information, visibility information and shape information from a region of an input image, determine a light source based on the shading information, the visibility information, and the shape information of the region, and generate a 3D rendering image by rendering the input image based on the determined light source.

The processor may be configured to determine a position of the light source based on the shading information and the visibility information.

The processor may be configured to extract a shadow boundary region from the shading information, and estimate the position of the light source based on visibility information of a pixel in the shadow boundary region.

The processor may be configured to estimate a position of the light source based on a maximum shading value in the shading information.

The processor may be configured to estimate the position of the light source based on surface normal information of a pixel having the maximum shading value.

In another general aspect, there is provided an electronic device, including a sensor configured to sense an input image, and a processor configured to extract shading information, visibility information, and shape information from a region of the input image, determine a light source based on the shading information, the visibility information, and the shape information of the region, and generate a three-dimensional (3D) image on a display by rendering the input image based on the determined light source.

The input image may include a color image, and the processor may be configured to filter out the albedo information from the color image to extract the shading information.

The processor may be configured to calculate a direction corresponding to a difference between visibility information of pixels included in a portion of the input image where a shading value between adjacent pixels varies, and estimate a position of the actual light source by integrating directions calculated from multiple pixels.

The processor may be configured to determine the position of the light source based on a shading value increasing as a surface normal of an object coincides with a direction from the object to the actual light source.

In another general aspect, there is provided an electronic device, including a sensor configured to sense an input image and an object, and a processor configured to extract shading information, visibility information, and shape information from a region of the input image, determine a light source based on the shading information, the visibility information, and the shape information of the region, and render a three-dimensional (3D) image on a display by combining a shape information of the object, the shape information of the region, and the input image based on the determined light source.

The processor may be configured to estimate a position of the light source based on surface normal information of a pixel of the region having the maximum shading value, and the surface normal information of the pixel is extracted from the input image by a neural network.

The processor may be configured to determine a light source based on the shading information of the region, the visibility information of the region, the shape information of the region, and the context information of the input image.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure. It will be understood that when a component is referred to as being "connected to" another component, the component can be directly connected or coupled to the other component or intervening components may be present.

The use of the term 'may' herein with respect to an example or embodiment, e.g., as to what an example or embodiment may include or implement, means that at least one example or embodiment exists where such a feature is included or implemented while all examples and embodiments are not limited thereto.

The terminology used herein is for describing various examples only, and is not to be used to limit the disclosure. The articles "a," "an," and "the" are intended to include the plural forms as well, unless the context clearly indicates otherwise. As used herein, the singular forms are intended to include the plural forms as well, unless the context clearly indicates otherwise. As used herein, the term "and/or" includes any one and any combination of any two or more of the associated listed items.

Hereinafter, the examples will be described in detail with reference to the accompanying drawings, wherein like drawing reference numerals are used for like elements, and duplicate description thereof will be omitted for conciseness.

Figure 1:
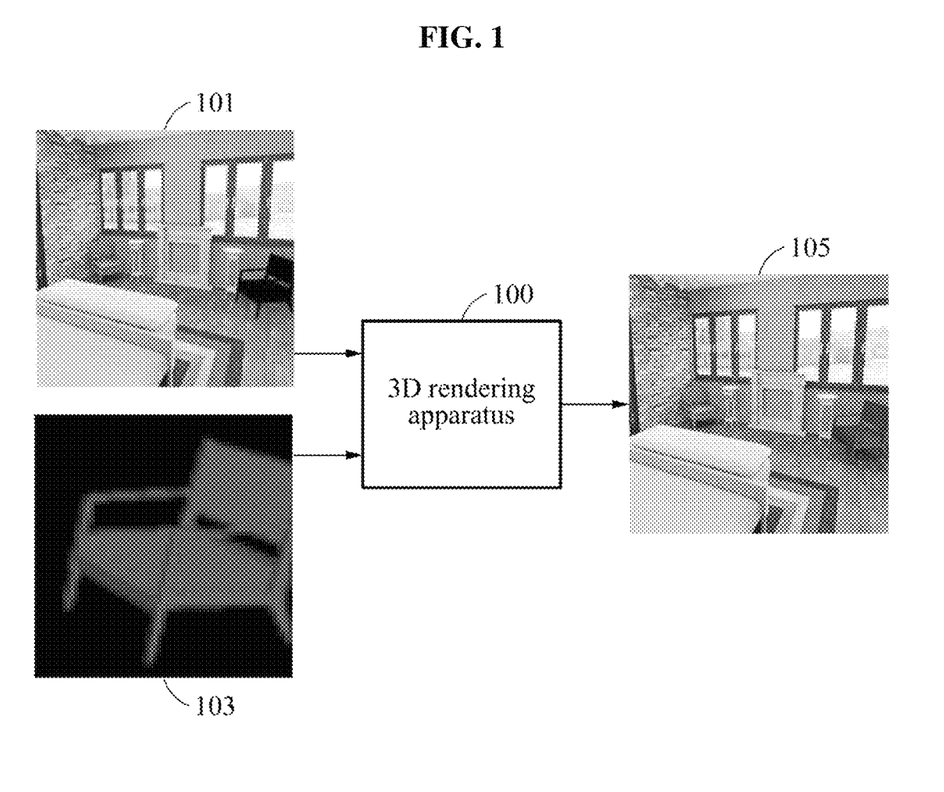
FIG. 1 illustrates an example of an overall configuration of a three-dimensional (3D) rendering apparatus.

FIG. 1 illustrates an example of an overall configuration of a three-dimensional (3D) rendering apparatus.

Referring to FIG. 1, a 3D rendering apparatus 100 generates a 3D rendering image 105 by combining an input image 101 and shape information 103 of an object. In an example, the 3D rendering apparatus 100 extracts shading information, shadow information, and shape information of a region of the input image 101. In an example, a region of the input image is a background of the input image 101. In an example, the background of the input image is any portion or region of the input image. In an example, the 3D rendering apparatus 100 estimates an actual light source based on the extracted shading information and shape information of the background, and generates a natural 3D rendering image based on the actual light source.

The 3D rendering image generated by the 3D rendering apparatus 100 is used to implement a 3D user interface (UI), 3D content, a virtual reality (VR), or an augmented reality (AR) in a variety of devices. The devices described herein refers to any devices such as, for example, an intelligent agent, a mobile phone, a cellular phone, a smart phone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a server, device such as a personal computer (PC), a laptop, a notebook, a netbook or tablet, a subnotebook, an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a navigation system, a global positioning system (GPS) navigation, a personal navigation device, portable navigation device (PND), a handheld game console, an e-book, a high definition television (HDTV), a 3D television (TV) or a digital information display (DID), a smart appliance, communication systems, image processing systems, graphics processing systems, various Internet of Things (IoT) devices that are controlled through a network, other consumer electronics/information technology (CE/IT) device, or any other device capable of wireless communication or network communication consistent with that disclosed herein. However, the mobile terminal is not limited to the examples described in the forgoing.

The 3D rendering apparatus 100 performs an extraction and generation process using a neural network (NN). In an example, the neural network has a plurality of layers including an input image, feature maps, and an output. In the neural network, a convolution operation is performed on the input image with a filter referred to as a kernel, and as a result, the feature maps are output. The convolution operation is performed again on the output feature maps as input feature maps, with a kernel, and new feature maps are output. When the convolution operation is repeatedly performed as such, a recognition result with respect to features of the input image may be finally output through the neural network.

The NN includes a deep neural network (DNN), which is a non-linear machine learning model, or an n-layer neural network. The DNN or n-layer neural network may correspond to a convolutional neural network (CNN), a recurrent neural network (RNN), a deep belief network, a fully connected network, a bi-directional neural network, a restricted Boltzman machine, or may include different or overlapping neural network portions respectively with full, convolutional, recurrent, and/or bi-directional connections. In an example, the DNN refers to a neural network trained through deep learning. In the deep learning, an input image is classified and used for training by the NN. The NN is also referred to as an artificial neural network.

In an example, the DNN includes an input layer, a hidden layer, and an output layer. In an example, the hidden layer includes a plurality of layers. In another example, the DNN also includes a pooling layer or a fully connected layer. Each layer of the DNN includes a plurality of nodes. The nodes of the layers are connected through weights, and nodes in a layer have an edge-less structure. The nodes in the hidden layer have a structure that is conditionally independent from the input layer.

In an example, the neural network is configured to process image data as an input image to the neural network to extract information about the input image for image recognition, image verification, image rendering, or image classification. For example, the neural network performs convolution with respect to image data, or one or more input feature maps corresponding to the input image, to generate an output feature map. The neural network generates an image recognition output, such as, for example, extracting a surface normal information directly from the input image, extracting context information from the input image, and extracting visibility information directly from the color image based on information in the output feature map. In an example, the neural network may indicate the result of the image recognition, verification or classification, either explicitly or implicitly. For example, the recognized, verified, or classified image or image feature may be explicitly indicated through a display of the neural network apparatus, or implicit indications may be provided through additional operations, or selective non-operations, of the neural network apparatus based on the result of the image recognition, verification, or classification.

A color shown at a point of an object is affected by various elements such as, for example, a shape and a material of the object, a light source, and a viewpoint. A color image including such color information of an object is divided into albedo information or reflectance information, shading information, and shadow information. The albedo information is a unique color component or material characteristic of the object which is determined by the shape and the material of the object, and is unrelated to the light source and the viewpoint.

The 3D rendering apparatus 100 extracts the shading information and the shape information of the background from the input image 101 using the Neural Network. The input image 101 includes a color image and a depth image. The color image includes albedo information, shadow information, and shading information. The 3D rendering apparatus 100 extracts the shape information of the background from the depth image. The 3D rendering apparatus 100 filters the albedo information out from the color image and extracts the shading information.

The shape information of the background is shape information of objects present in the input image 101, except for an object. In an example, the shape information includes surface normal information and depth information. In an example, the shadow information refers to a shadow generated in a background by an object blocking light from a light source. In an example, the shading information refers to a shade generated on the object by the light from the light source. The shading information indicates a luminous characteristic value when the light from the light source reacts with a surface normal of the object. In an example, the shading information is information related to a shading value determined by a vector inner product between a radiation direction of the light source and the surface normal of the object, and the surface normal indicates a normal component of a surface of a 3D object. In an example, a change in the surface normal of the object is estimated through a change in the shading information.

In an example, the shadow information and the shading information are not directly distinguished. In an example, the shadow information and the shading information are not distinguished in terms of the shading caused by the light source. In an example, the shadow information and the shading information, which are distinguished by the causes of each phenomenon, may be collectively referred to as shading information. The shadow information and the shading information, however, may be distinguished indirectly through the shape information of the background or the shape information of the object. Herein, the shading information is used to indicate both a shadow generated in the background by the object blocking the light from the light source and a shade generated on the object by the light from the light source.

The 3D rendering apparatus 100 estimates the actual light source based on the shape information of the background and the shading information using the neural network. The 3D rendering apparatus 100 estimates the actual light source from the shading information. In an example, the 3D rendering apparatus 100 estimates a position or a brightness of the actual light source from the shading information. In an example, the 3D rendering apparatus 100 estimates the position of the actual light source by integrating the position of the actual light source estimated from the shading information.

In an example, the 3D rendering apparatus 100 calculates a direction corresponding to a difference between visibility information of pixels included in a region in which a shading value between adjacent pixels varies in an input image. In an example, the 3D rendering apparatus 100 estimates a final position of the actual light source by integrating directions calculated from multiple pixels.

The 3D rendering apparatus 100 generates a 3D rendering image by combining the actual light source estimated using the neural network, the shape information of the object, and the input image. The 3D rendering apparatus 100 calculates a new shadow value and a new shading value using the shape information of the object based on the actual light source, and applies the calculated shadow value and shading value to the input image. In an example, the 3D rendering apparatus 100 calculates the shading value of the object for each pixel using the surface normal information of the object based on an intensity and a direction of the light from the actual light source. The 3D rendering apparatus 100 calculates, for each pixel, shadow values for different objects or backgrounds existing in the input image based on the actual light source and the shape information of the object.

In an example, the 3D rendering apparatus 100 separates the shading information from the input image, and indirectly estimates the actual light source using a pre-trained neural network. In an example, the 3D rendering apparatus 100 performs 3D rendering by estimating the actual light source and calculating a phenomenon caused by the estimated actual light source, thereby generating a more natural and realistic 3D rendering image.

The 3D rendering apparatus 100 estimates the position of the actual light source from the shading information. In an example, the 3D rendering apparatus 100 estimates the position of the actual light source from the shading information based on a shadow of the object being generated in an direction that is opposite to the light source from the object. In an example, to estimate the position of the actual light source more precisely, the 3D rendering apparatus 100 calculates visibility information with respect to each pixel.

The 3D rendering apparatus 100 estimates the position of the actual light source from the shading information. The 3D rendering apparatus 100 estimates the position of the actual light source based on the shading value increasing as a distance between the object and the actual light source decreases and the shading value increasing as the surface normal of the object coincides with a direction from the object to the actual light source.

In an example, the color image is acquired through an image sensor. In an example, the image sensor includes devices, such as, for example, a complementary metal-oxide-semiconductor (CMOS) image sensor, a charge-coupled device (CCD) image sensor, a stereo camera, or any device that acquires a color image or a color frame of a subject or an object. The color image includes color pixels, and each color pixel has a color value.

A depth sensor is a device that acquires a depth image or a depth frame of a subject that is the object as the subject of the color image, and includes, for example, a Kinect, a time-of-flight (TOF) depth camera, or an optical 3D scanner. The depth image corresponds to the color image, and includes depth pixels. Each depth pixel has a depth value indicating distance information with respect to the subject. The color image acquired by the image sensor and the depth image acquired by the depth sensor are provided to the 3D rendering apparatus 100. In this example, the color sensor and the depth sensor transfer a stream of color images and a stream of depth images to the 3D rendering apparatus 100, respectively.

When a stereo camera is used as the image sensor, the stereo camera acquires a stereo image including a left image and a right image, and provides the acquired stereo image to the 3D rendering apparatus 100. A depth image is generated from the stereo image through stereo matching. In this example, the 3D rendering apparatus 100 acquires a color image including the left image and the right image and the depth image together from the stereo image, without receiving the depth image from a separate depth sensor.

Hereinafter, a method of generating a 3D rendering image by estimating an actual light source, the method performed by the 3D rendering apparatus 100, will be described in detail with reference to the drawings.

Figure 2:
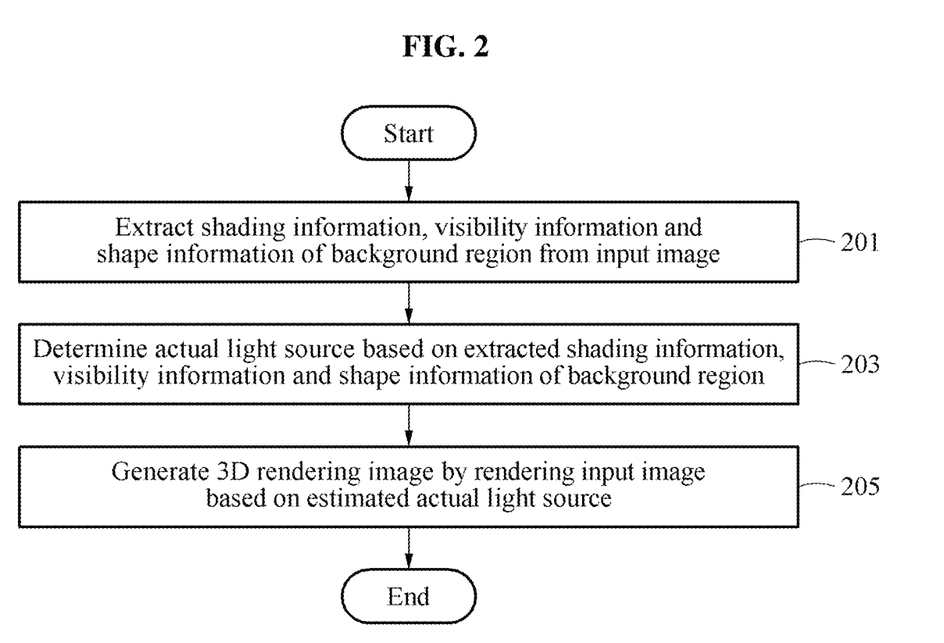
FIG. 2 is a diagram illustrating an example of a 3D rendering method.

FIG. 2 is a diagram illustrating an example of a 3D rendering method. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

Referring to FIG. 2, in operation 201, the 3D rendering apparatus 100 extracts shading information, visibility information, and shape information of a background region from an input image. In an example, the visibility information indicates whether there is an occlusion at a position of a pixel included in the input image for a plurality of directions. The 3D rendering apparatus 100 determines whether there is an occlusion for a plurality of directions of each pixel based on the shape information of the background region. For example, a determination is made for each pixel of the input image, whether there is an occlusion with respect to 10*10 directions. Visibility information of each direction is set to "1" when there is occlusion, or "0" when there is no occlusion.

In operation 203, the 3D rendering apparatus 100 determines an actual light source based on the extracted shading information, visibility information and shape information of the background region. In an example, the 3D rendering apparatus 100 determines a position of the actual light source based on the shading information and the visibility information. The 3D rendering apparatus 100 determines the position of the actual light source based on a maximum shading value included in the shading information. The 3D rendering apparatus 100 determines the position of the actual light source based on surface normal information of a pixel having the maximum shading value. The 3D rendering apparatus 100 determines a brightness of the actual light source based on a difference between shadow values of adjacent pixels included in a shadow boundary region. Here, the difference between the shadow values is referred to as a shading delta.

In operation 205, the 3D rendering apparatus 100 generates a 3D rendering image by rendering the input image based on the estimated actual light source.

Figure 3:
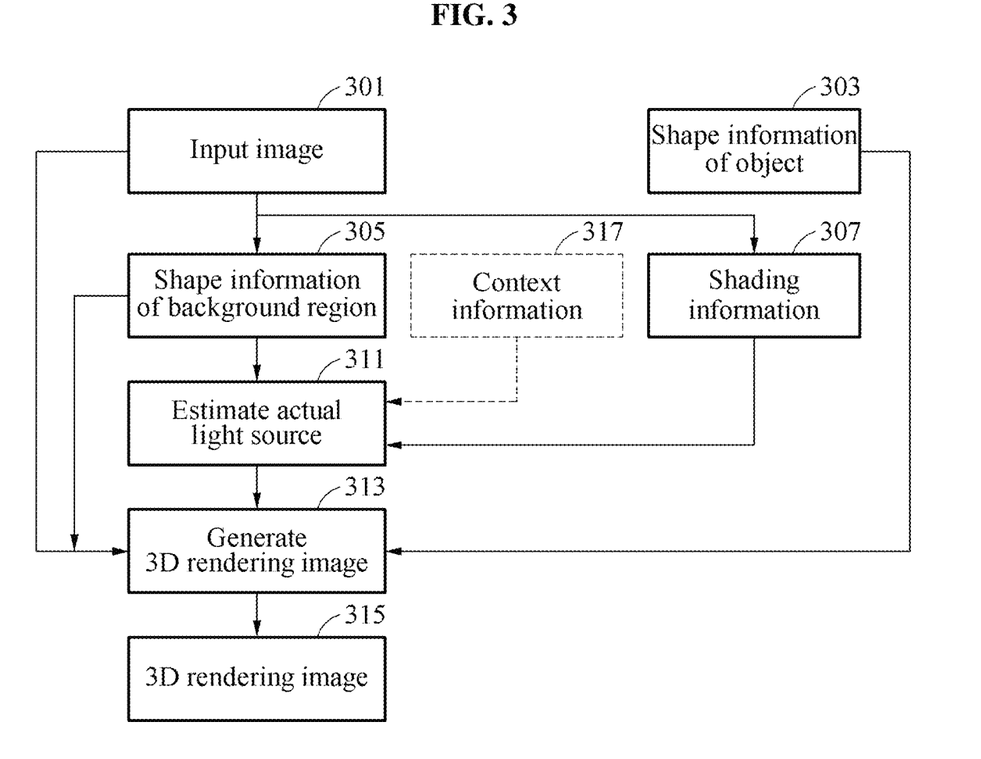
FIG. 3 illustrates an example of a 3D rendering method.

FIG. 3 illustrates an example of a 3D rendering method. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

Referring to FIG. 3, in operation 301, the 3D rendering apparatus 100 acquires an input image. The 3D rendering apparatus 100 acquires the input image directly using an image sensor or a depth sensor, or receives the input image using an input/output (I/O) interface. In an example, the input image includes a color image and a depth image. In operation 303, the 3D rendering apparatus 100 acquires shape information of an object.

The input image includes a color image. The input image includes a color image and a depth image. When the input image includes the depth image, a position of an actual light source may be estimated more accurately.

In an example, the 3D rendering apparatus 100 extracts shape information of a background region and shading information from the input image. In operation 305, the 3D rendering apparatus 100 extracts the shape information of the background region from the depth image. In operation 307, the 3D rendering apparatus 100 extracts the shading information from the color image. In an example, the 3D rendering apparatus 100 also extracts albedo information.

In an example, the 3D rendering apparatus 100 extracts the shape information of the background region from the color image. The 3D rendering apparatus 100 extracts the shape information of the background region from the color image and the depth image. When the depth image is used, the shape information is extracted more accurately and easily. In an example, the shape information includes depth information, surface normal information, and 3D bounding box information.

In an example, the 3D rendering apparatus 100 extracts shading information of color pixels from the color image. The shading information includes surface normal information indicating a surface normal component of an object. In an example, a color of each color pixel included in the color image is expressed by a product of a shading component and an albedo component which is a unique color of the object. Based on a characteristic that the albedo component changes sharply and the shading component changes relatively smoothly in a color space, the albedo component and the shading component are separated from the color image. For example, when a color changes between adjacent color pixels, the albedo component represents a discontinuity, whereas the shading component represents a continuity. Using such a characteristic, in an example, the albedo component and the shading component are extracted from the color image. In an example, the shading component is determined by a vector inner product between a radiation direction of the actual light source and a surface normal of the object. Thus, when assuming that the radiation direction of the actual light source is known or the radiation direction of the light source is uniform in a whole region of the color image, a change in the surface normal component is estimated through a change in the shading component. Even in a case in which the radiation direction of the light source is non-uniform or a plurality of light sources are present, the 3D rendering apparatus 100 estimates the change in the surface normal component through the change in the shading component.

The 3D rendering apparatus 100 extracts visibility information from the depth image and the color image. The 3D rendering apparatus 100 extracts the surface normal information from the shading information. The 3D rendering apparatus 100 extracts the surface normal information directly from the input image through an neural network trained by deep learning. The 3D rendering apparatus 100 extracts the visibility information based on the surface normal information and the depth information of the depth image.

The visibility information is extracted based on various combinations of shape information, for example, the depth information, the surface normal information or the 3D bounding box information. Further, the visibility information is extracted directly from the color image through the NN trained by deep learning.

In operation 311, the 3D rendering apparatus 100 estimates the actual light source. In an example, the 3D rendering apparatus 100 estimates the actual light source based on the shading information. In an example, the 3D rendering apparatus 100 estimates a position and a brightness of the actual light source based on the shading information and the shape information of the background region. Based on a principle that a shadow appears on an opposite side of a light source from an object, the 3D rendering apparatus 100 estimates the position of the actual light source. The 3D rendering apparatus 100 extracts a shadow boundary region from the shading information, and estimates the position of the actual light source based on visibility information of the shadow boundary region. The 3D rendering apparatus 100 estimates the position of the actual light source based on a difference, for example, a visibility delta, between visibility information of adjacent pixels included in the shadow boundary region.

In an example, the 3D rendering apparatus 100 determines whether a pixel of the input image corresponds to the shadow boundary region based on a variation of a shadow value of the pixel of the input image and a threshold value. When the actual light source is a point light source, a shadow boundary region generated by an object has a width of "0". However, in reality, the actual light source is a surface light source. Thus, the shadow boundary region has an area, and each pixel has a different shadow value in the shadow boundary region. In an example, the 3D rendering apparatus 100 compares a variation of the shadow value to the threshold value, thereby determining whether the corresponding pixel is included in the shadow boundary region.

In an example, the 3D rendering apparatus 100 estimates the brightness of the actual light source based on the shadow value of the shadow boundary region. As an area of the actual light source increases, the shadow boundary region widens and a rate of change of the shadow value in the shadow boundary region decreases. The 3D rendering apparatus 100 estimates the brightness of the actual light source by calculating the rate of change of the shadow value of the shadow boundary region.

The 3D rendering apparatus 100 estimates the actual light source based on the shading information. In an example, the 3D rendering apparatus 100 estimates the position of the actual light source based on the shading information, considering that when the object is closer to the light source or a normal direction of an object surface faces the light source, the shading value of the object is greater.

In another example, in operation 317, the 3D rendering apparatus 100 obtains context information. The context information is information obtained separately from the input image. For example, when the input image is an image acquired by capturing an indoor place, such as a room, the context information is information representing the input image is the room. The 3D rendering apparatus 100 extracts the context information from the input image. The 3D rendering apparatus 100 extracts information indicating that the input image is an image of an indoor place, through the neural network.

In operation 311, the 3D rendering apparatus 100 estimates the actual light source based on the shading information and the context information. In an example, the 3D rendering apparatus 100 determines an environment to which a background belongs from the input image. The 3D rendering apparatus 100 calculates a probability of the actual light source existing in each region of the input image based on information related to the probability of the actual light source being present with respect to a position corresponding to the identified environment. For example, when the context information indicates that the input image is of an indoor place, the 3D rendering apparatus 100 determines that a probability of a position of the actual light source being at a portion corresponding to a ceiling in the input image is high. The 3D rendering apparatus 100 estimates the position of the actual light source in view of the probability of existence of the actual light source.

In operation 313, the 3D rendering apparatus 100 generates a 3D rendering image by combining the shape information of the background region, the estimated actual light source, and the input image with the shape information of the object. In operation 315, the 3D rendering apparatus 100 outputs the 3D rendering image. The actual light source is estimated based on the information included in the existing input image, and thus a natural effect that conforms to the input image is generated. Since the actual light source is newly defined on a 3D space, a more natural effect is applied to an object to be inserted into the input image.

In another example, the 3D rendering apparatus 100 compares the albedo information extracted from the input image and the surface normal information extracted from the shading information to albedo information and surface normal information of the object, respectively. The 3D rendering apparatus 100 determines a pixel value of the 3D rendering image from a pixel value of the input image based on a result of the comparison. When the comparison result satisfying a threshold, the 3D rendering apparatus 100 determines the pixel value of the 3D rendering image by interpolating pixels values of a first pixel and a second pixel of the input image.

In an example, the 3D rendering apparatus 100 renders a virtual object based on shading values of similar neighboring pixels in which light is already reflected, rather than estimating an actual light source and rendering a new virtual object. In an example, the 3D rendering apparatus 100 calculates a color value of a pixel of the virtual object by multiplying an albedo value of the pixel of the virtual object by a shading value of a neighboring pixel which is similar to the pixel included in the virtual object. The 3D rendering apparatus 100 estimates the shading value of the pixel included in the virtual object by interpolating the shading value of the neighboring pixel similar to the pixel included in the virtual object.

Figure 4:
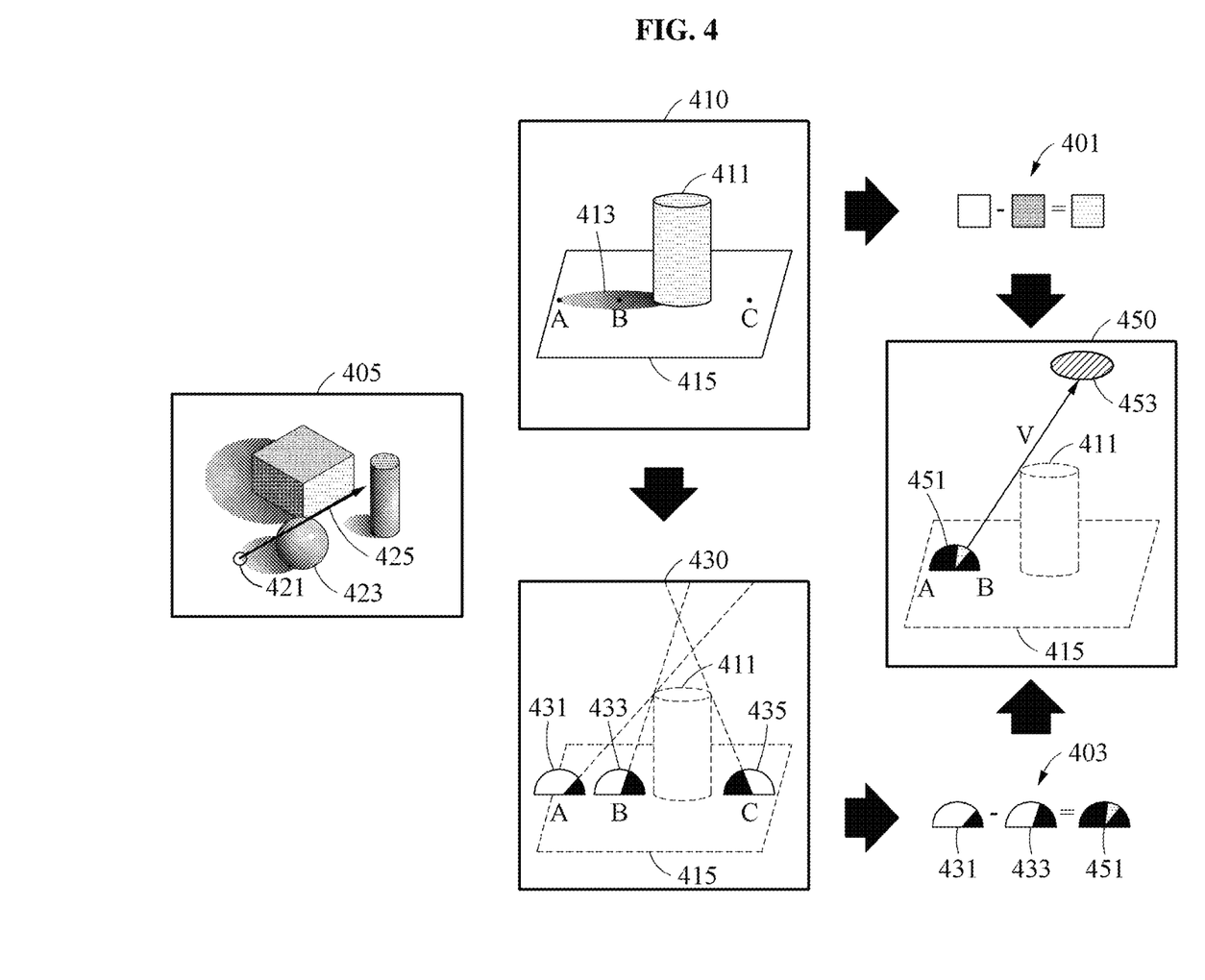
FIG. 4 illustrates an example of estimating an actual light source based on shading information in a 3D rendering method.

FIG. 4 illustrates an example of estimating an actual light source based on shading information in a 3D rendering method.

Referring to FIG. 4, in 405 a shadow is generated on a left side of an object 423. A shadow is formed in an opposite direction of a light source from an object. Thus, a 3D rendering apparatus estimates that an actual light source exists on a right side. The 3D rendering apparatus calculates a rate of change of a shadow value between adjacent pixels, and detects a shadow boundary region 421 based on the calculated rate of change. In an example, the 3D rendering apparatus estimates that the actual light source exists in a direction of a vector 425 toward a boundary of the object 423 from pixels included in the shadow boundary region 421.

For example, a screen 410 includes a background region 415, a shadow 413, and an object 411. The shadow 413 is formed on a left side of the object 411, and thus it is estimated that the actual light source exists on a right side. The 3D rendering apparatus estimates a more accurate position of the actual light source based on shading information.

Referring to a screen 430, the 3D rendering apparatus extracts visibility information with respect to pixels A, B, and C of the input image. The 3D rendering apparatus determines whether there is an occlusion with respect to a plurality of directions, for each of the pixels A, B, and C. For example, the 3D rendering apparatus extracts visibility information 431 with respect to the pixel A in view of the object 411. The 3D rendering apparatus extracts visibility information 433 with respect to the pixel B in view of the object 411. The 3D rendering apparatus extracts visibility information 435 with respect to the pixel C in view of the object 411. In the visibility information 431, 433 and 435, white portions indicate open states, and black portions indicate closed states. For example, a memory corresponding to 10*10 directions with respect to each pixel is allocated, "1" is stored for an open state and "0" is stored in a closed state with respect to each direction.

In an example, the 3D rendering apparatus extracts the shadow boundary region based on the rate of change of the shadow value. The 3D rendering apparatus extracts the shadow boundary region based on whether the rate of change of the shadow value satisfies a threshold. For example, referring to the screen 410, a change in the shadow value between pixels adjacent to the pixel C is "0", and a change in the shadow value between pixels adjacent to each of the pixel A and the pixel B is greater than the threshold value. The 3D rendering apparatus extracts a region including the pixel A and the pixel B as the shadow boundary region.

In an example, the 3D rendering apparatus estimates the actual light source based on the visibility information of the pixels included in the shadow boundary region. In operation 403, the 3D rendering apparatus calculates a difference 451 between the visibility information 431 of the pixel A and the visibility information 433 of the pixel B. In an example, the pixel A and the pixel B are adjacent to each other. A difference between a white portion of the visibility information 431 and a white portion of the visibility information 433 corresponds to a left black portion of the difference 451. A difference between a black portion of the visibility information 431 and a black portion of the visibility information 433 corresponds to a right black portion of the difference 451. A difference between the white portion of the visibility information 431 and the black portion of the visibility information 433 corresponds to a white portion of the difference 451.

Referring to a screen 450, it is estimated that the actual light source exists in a direction indicated by the white portion of the difference 451. The 3D rendering apparatus determines a vector v corresponding to the white portion of the difference 451. The vector v indicates a region 450. The 3D rendering apparatus estimates that the actual light source exists in a direction indicated by the vector v.

The 3D rendering apparatus estimates a brightness of the actual light source based on shadow values of the pixels included in the shadow boundary region. In operation 401, the 3D rendering apparatus calculates the difference 451 between the shadow value of the pixel A and the shadow value of the pixel B. The 3D rendering apparatus estimates the brightness of the actual light source based on the rate of change of the shadow value. For example, the 3D rendering apparatus estimates that a brightness per unit area of the actual light source is relatively great as the rate of change of the shadow value between adjacent pixels is relatively great.

Figure 5:
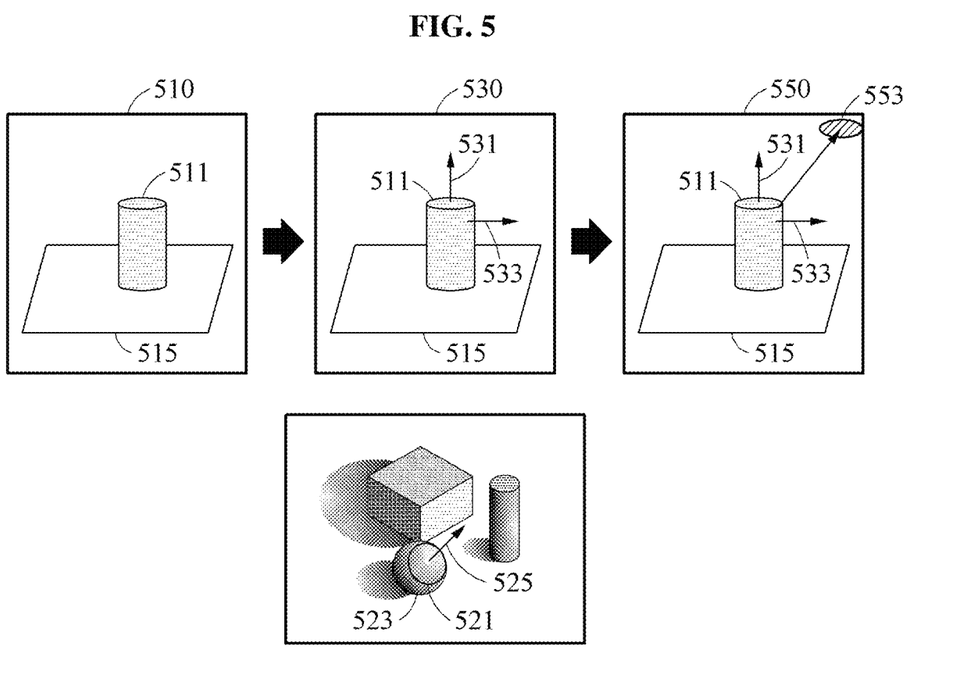
FIG. 5 illustrates an example of estimating an actual light source based on shading information in a 3D rendering method.

FIG. 5 illustrates an example of estimating an actual light source based on shading information in a 3D rendering method.

Referring to FIG. 5, a shading value of an object 523 changes gradually along pixels. The shading value of the object 523 is maximized in a region 521. A shading of the object 523 is brightest in the region 521. A 3D rendering apparatus estimates a position of an actual light source based on a maximum shading value included in shading information. The 3D rendering apparatus determines that a probability of the actual light source existing in a direction indicated by a normal vector 525 of a pixel having the maximum shading value is high. For example, the 3D rendering apparatus estimates the position of the actual light source based on the Lambert's law.

The 3D rendering apparatus determines that a current depth pixel corresponding to a current color pixel exists in a flat surface region of an object, when a gradient of surface normal information between the current color pixel and color pixels adjacent to the current color pixel is "0" or practically close to "0". If the corresponding gradient changes slowly between the color pixels, it is determined that the current depth pixel exists in a curved surface region of the object.

A screen 510 includes a background region 515 and an object 511. Referring to a screen 530, the object 511 has a discontinuous surface normal unlike an object 521, and a rate of change of a shading value is discontinued on a boundary between a plane to which a start point of a vector 531 belongs and a plane to which a start point of a vector 533 belongs. The shading value is maximized at the start point of the vector 531 and the start point of the vector 533.

Referring to a screen 550, the 3D rendering apparatus estimates a region 553 in which a probability of the actual light source existing is relatively high based on the vector 531 and the vector 533. As described above, the 3D rendering apparatus estimates the position of the actual light source based on the shading information.

Figure 6:
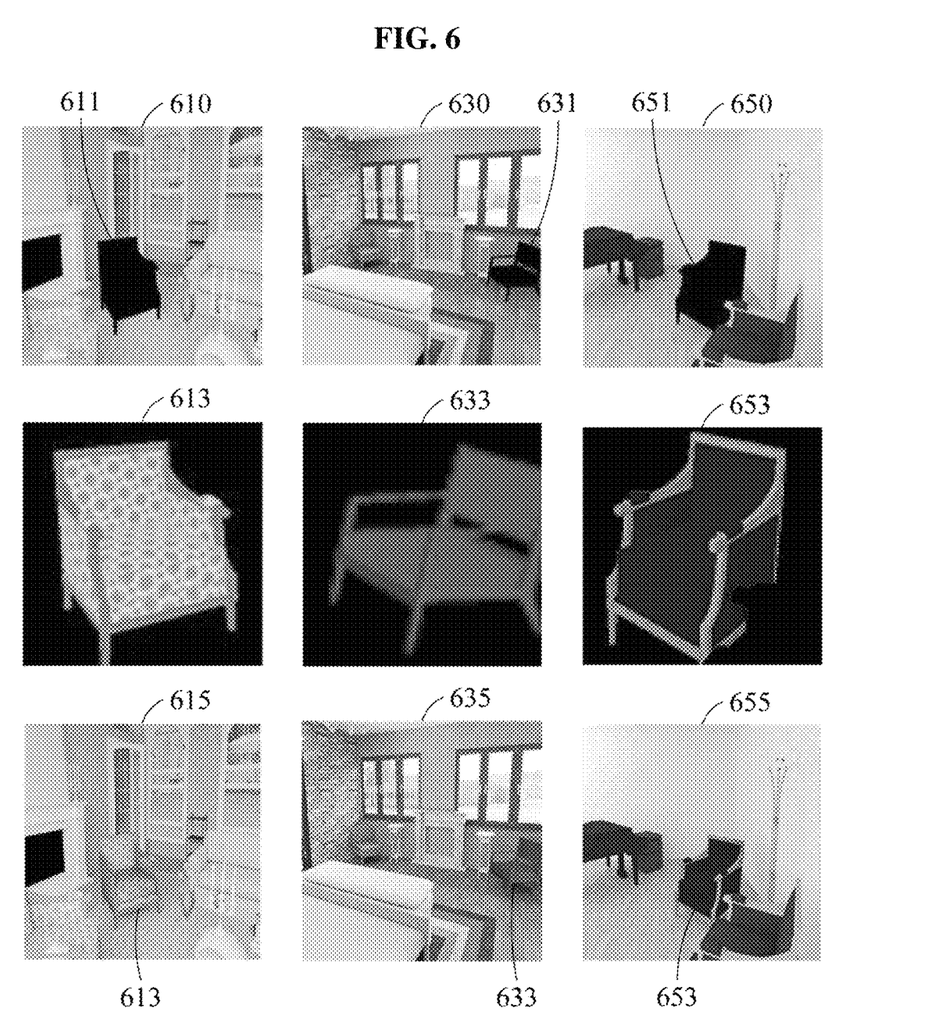
FIG. 6 illustrates examples of 3D rendering images acquired by a 3D rendering method.

FIG. 6 illustrates examples of 3D rendering images acquired by a 3D rendering method.

In an example, a 3D rendering apparatus acquires an input image 610 and shape information 613 of an object. The 3D rendering apparatus determines a position 611 at which the object is to be disposed in the input image 610. The 3D rendering apparatus estimates an actual light source using the method described above. The 3D rendering apparatus disposes the object in the input image 610 based on the shape information 613 of the object, and applies the estimated actual light source. The 3D rendering apparatus generates a 3D rendering image 615.

In an example, the 3D rendering apparatus acquires an input image 630 and shape information 633 of an object. The 3D rendering apparatus determines a position 631 at which the object is to be disposed in the input image 630. The 3D rendering apparatus estimates an actual light source using the method described above. The 3D rendering apparatus disposes the object in the input image 630 based on the shape information 633 of the object, and applies the estimated actual light source. The 3D rendering apparatus generates a 3D rendering image 635.

In an example, the 3D rendering apparatus acquires an input image 650 and shape information 653 of an object. The 3D rendering apparatus determines a position 651 at which the object is to be disposed in the input image 650. The 3D rendering apparatus estimates an actual light source using the method described above. The 3D rendering apparatus disposes the object in the input image 650 based on the shape information 653 of the object, and applies the estimated actual light source. The 3D rendering apparatus generates a 3D rendering image 655.

Figure 7:
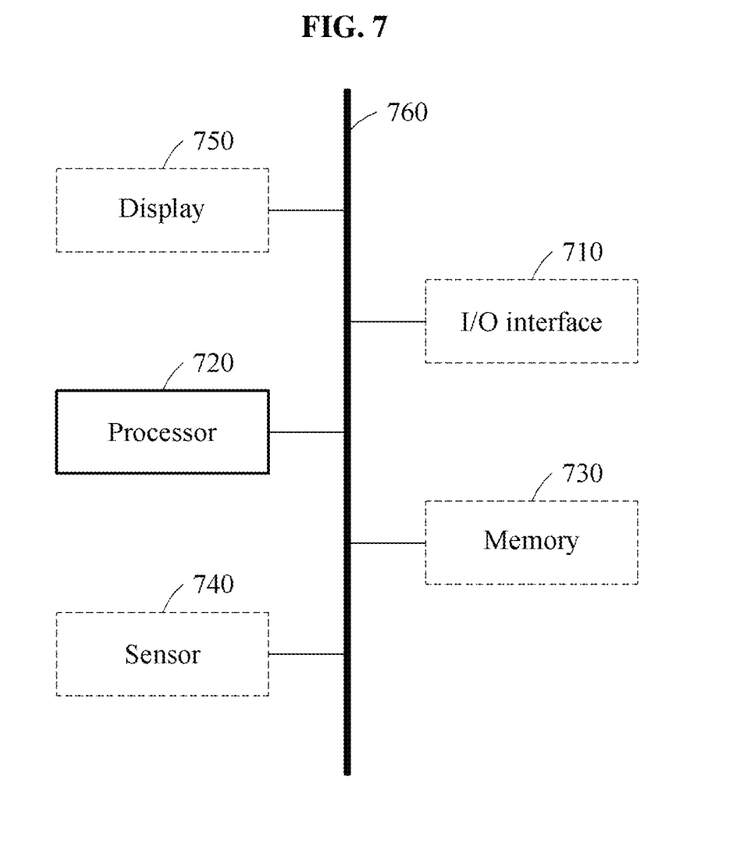
FIG. 7 illustrates an example of a configuration of a 3D rendering apparatus.

FIG. 7 illustrates an example of a configuration of a 3D rendering apparatus 700.

Referring to FIG. 7, a 3D rendering apparatus 700 includes a processor 720. The 3D rendering apparatus further includes an I/O interface 710, a memory 730, a sensor 740, and a display 750. The I/O interface 710, the processor 720, the memory 730, the sensor 740, and the display 750 communicate with each other through a communication bus 760.

The I/O interface 710 receives an input image from an image sensor 740. The input image includes a color image or a depth image. The I/O interface 710 transmits the acquired color image and depth image to any one or any combination of the processor 720 and the memory 730.

The processor 720 controls the 3D rendering apparatus 700, and processes at least one operation related to the 3D rendering method described above. As described below, the processor 1820 may be a graphics processor unit (GPU), reconfigurable processor, or have any other type of multi- or single-processor configuration. The processor 720 extracts shading information, visibility information, and shape information of a background region from the input image. The processor 720 estimates an actual light source based on the extracted shading information, visibility information, and shape information of the background region. The processor 720 generates a 3D rendering image by rendering the input image based on the estimated actual light source. In an example, 3D rendering apparatus 700 renders the input image based on the estimated actual light source on the display 750

In an example, the processor 720 estimates a position of the actual light source based on the shading information and the visibility information. The processor 720 extracts a shadow boundary region from the shading information, and estimates the position of the actual light source based on visibility information of a pixel included in the shadow boundary region.

In another example, the processor 720 estimates the position of the actual light source based on a maximum shading value included in the shading information. The processor 720 estimates the position of the actual light source based on surface normal information of a pixel having the maximum shading value.

In another example, the processor 720 estimates the actual light source more accurately by integrating multiple determination of the actual light source estimated from the shading information. The processor 720 increases an accuracy of estimating the actual light source based on context information of the input image.

In addition, the processor 720 performs the at least one operation described with reference to FIGS. 1 through 6. Thus, duplicate description will be omitted for conciseness.

The memory 730 stores information used during the 3D rendering process described above and result information. In addition, the memory 730 stores computer-readable instructions. When the instructions stored in the memory 730 are executed by the processor 720, the processor 720 processes the at least one operation described above.

The sensor 740 includes, for example, an image sensor to sense video data and audio data to recognize an object, for example. In an example, the sensor 740 senses an image using a well-known scheme, for example, a scheme of converting an optical image to an electronic signal. An output of the sensor 740 is transferred to the processor 720 or the memory 730, and output of the sensor 740 may also be transferred directly to, or operate as, an input layer of a neural network discussed herein.

The 3D rendering apparatus receives a user input or outputs a result of correcting a depth image or data based on the corrected depth image through the I/O interface 710. Further, the 3D rendering apparatus is connected to an external device, for example, a PC or a network, through the I/O interface 710, and exchanges data with the external device.

In an example, the result of correcting a depth image is output to a display 750. In an example, the display 750 is a physical structure that includes one or more hardware components that provide the ability to render a user interface and/or receive user input. In an example, the display can be embedded in the 3D rendering apparatus 700. In an example, the display 750 is an external peripheral device that may be attached to and detached from the 3D rendering apparatus 700. The display 750 may be a single-screen or a multi-screen display.

The 3D rendering apparatus 100, other apparatuses, units, modules, devices, and other components described herein with respect to FIGS. 1 and 7 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method for three-dimensional (3D) rendering, the method comprising:
    extracting shading information, visibility information, and shape information from a region of an input image;
    determining a light source based on the shading information, the visibility information, and the shape information of the region; and
    generating a 3D rendering image by rendering the input image based on the determined light source,
    wherein the region is a background region of the input image.

2. The method of claim 1, wherein the determining of the light source comprises estimating a position of the light source based on the shading information and the visibility information.

3. The method of claim 2, wherein the estimating of the light source comprises estimating the position of the light source based on visibility information of a pixel selected based on the shading information.

4. The method of claim 3, wherein the estimating of the light source comprises:
    estimating that the light source is present in a direction corresponding to a difference of visibility information of pixels in a portion of the input image where a shadow value of adjacent pixels varies.

5. The method of claim 3, wherein the estimating of the light source comprises:

extracting a shadow boundary region from the shading information; and estimating the position of the light source based on visibility information of a pixel in the shadow boundary region.

6. The method of claim 5, wherein the estimating of the light source comprises estimating the position of the light source based on a difference between visibility information of adjacent pixels in the shadow boundary region.

7. The method of claim 5, wherein the extracting of the shadow boundary region comprises determining whether a pixel of the input image corresponds to the shadow boundary region based on a comparison of a variation of a shadow value of the pixel and a threshold value.

8. The method of claim 1, wherein the determining of the light source comprises:

extracting a shadow boundary region from the shading information; and estimating a brightness of the light source based on shading information of a pixel in the shadow boundary region.

9. The method of claim 8, wherein the estimating of the brightness of the light source comprises estimating the brightness of the light source based on a difference between shadow values of adjacent pixels in the shadow boundary region.

10. The method of claim 1, wherein the determining of the light source comprises estimating a position of the light source based on a maximum shading value in the shading information.

11. The method of claim 10, wherein the estimating of the light source comprises estimating the position of the light source based on surface normal information of a pixel having the maximum shading value.

12. The method of claim 1, wherein the determining of the light source comprises estimating a position of the light source based on context information of the input image.

13. The method of claim 1, wherein the input image comprises a color image, wherein the extracting comprises:

extracting the shape information of the region from the color image;

extracting the shading information and albedo information from the color image; and extracting the visibility information from the color image.

14. The method of claim 13, wherein the input image further comprises a depth image, wherein the extracting comprises:

extracting the shape information of the region from the depth image and the color image; and extracting the visibility information from the depth image and the color image.

15. The method of claim 14, wherein the shape information of the region comprises surface normal information, wherein the extracting of the visibility information comprises extracting the visibility information based on depth information of the depth image, 3D bounding box information of the input image, the surface normal information, or the color image.

16. The method of claim 1, wherein the visibility information indicates whether a position of a pixel in the input image is occluded with respect to a plurality of directions.

17. The method of claim 1, wherein the generating comprises generating the 3D rendering image by combining shape information of an object, the shape information of the region, and the input image based on the determined light source.

18. The method of claim 17, wherein the generating comprises:

comparing albedo information extracted from the input image and surface normal information of the region with albedo information, depth information, type or surface normal information of the object; and determining a pixel value of the 3D rendering image from a pixel value of the input image based on a result of the comparing.

19. The method of claim 18, wherein the determining comprises determining the pixel value of the 3D rendering image by interpolating pixel values of a first pixel and a second pixel of the input image, in response to the result of the comparing satisfying a threshold.

20. A non-transitory computer-readable storage medium storing instructions that, when executed by a processor, cause the processor to perform the method of claim 1.

21. An apparatus for three-dimensional (3D) rendering, the apparatus comprising:

a processor configured to:

extract shading information, visibility information and shape information from a region of an input image, determine a light source based on the shading information, the visibility information, and the shape information of the region, and generate a 3D rendering image by rendering the input image based on the determined light source, wherein the region is a background region of the input image.

22. The apparatus of claim 21, wherein the processor is further configured to determine a position of the light source based on the shading information and the visibility information.

23. The apparatus of claim 22, wherein the processor is further configured to:

extract a shadow boundary region from the shading information, and estimate the position of the light source based on visibility information of a pixel in the shadow boundary region.

24. The apparatus of claim 21, wherein the processor is further configured to estimate a position of the light source based on a maximum shading value in the shading information.

25. The apparatus of claim 24, wherein the processor is further configured to estimate the position of the light source based on surface normal information of a pixel having the maximum shading value.

26. An electronic device, comprising:

a sensor configured to sense an input image; and a processor configured to:

extract shading information, visibility information, and shape information from a region of the input image, determine a light source based on the shading information, the visibility information, and the shape information of the region, and generate a three-dimensional (3D) image on a display by rendering the input image based on the determined light source, wherein the region is a background region of the input image.

27. The device of claim 26, wherein the input image comprises a color image, and the processor is further configured to filter out the albedo information from the color image to extract the shading information.

28. The device of claim 26, wherein the processor is further configured to calculate a direction corresponding to a difference between visibility information of pixels included in a portion of the input image where a shading value between adjacent pixels varies, and estimate a position of the actual light source by integrating directions calculated from multiple pixels.

29. The device of claim 26, wherein the processor is further configured to determine the position of the light source based on a shading value increasing as a surface normal of an object coincides with a direction from the object to the actual light source.

30. An electronic device, comprising:
a sensor configured to sense an input image and an object; and
a processor configured to:
extract shading information, visibility information, and shape information from a region of the input image,
determine a light source based on the shading information, the visibility information, and the shape information of the region, and
render a three-dimensional (3D) image on a display by combining a shape information of the object, the shape information of the region, and the input image based on the determined light source,
wherein the region is a background region of the input image.

31. The device of claim 30, wherein the processor is further configured to estimate a position of the light source based on surface normal information of a pixel of the region having the maximum shading value, and the surface normal information of the pixel is extracted from the input image by a neural network.

32. The device of claim 30, wherein the processor is further configured to determine a light source based on the shading information of the region, the visibility information of the region, the shape information of the region, and the context information of the input image.

* * * * *